Jan. 18, 1944.   E. L. BISHOP   2,339,543
COLLAPSIBLE FORM
Filed Oct. 10, 1940   2 Sheets-Sheet 1

INVENTOR
Earl L. Bishop
BY Ely & Frye
ATTORNEYS

Jan. 18, 1944.　　E. L. BISHOP　　2,339,543
COLLAPSIBLE FORM
Filed Oct. 10, 1940　　2 Sheets-Sheet 2

INVENTOR
Earl L. Bishop
Ely & Frye
ATTORNEYS

Patented Jan. 18, 1944

2,339,543

UNITED STATES PATENT OFFICE 2,339,543

COLLAPSIBLE FORM

Earl L. Bishop, Akron, Ohio, assignor to The Firestone Tire & Rubber Company, Akron, Ohio, a corporation of Ohio Application October 10, 1940, Serial No. 360,522

9 Claims. (Cl. 154—9)

This invention relates to collapsible forms, and more especially it relates to collapsible forms or drums such as are used in the manufacture of pneumatic tire casings of the flat band type.

The invention is of primary utility in the manufacture of tires having relatively small bead diameter as compared to the outside diameter and transverse diameter of the tires, such tires being used, for example, upon the undercarriages of aircraft. Because of the relatively small bead diameter of such tires, the removal therefrom of the forms upon which the tires are fabricated heretofore has presented a troublesome problem, and it is to the relief of this problem that this invention primarily is directed.

The chief objects of the invention are to provide an improved tire building form for manufacture of tires of the character mentioned. More specifically the invention aims to provide a collapsible form of maximum collapsibility; and to provide such a form that may be collapsed manually, or by the use of power. Other objects will be manifest as the description proceeds.

Figure 1:
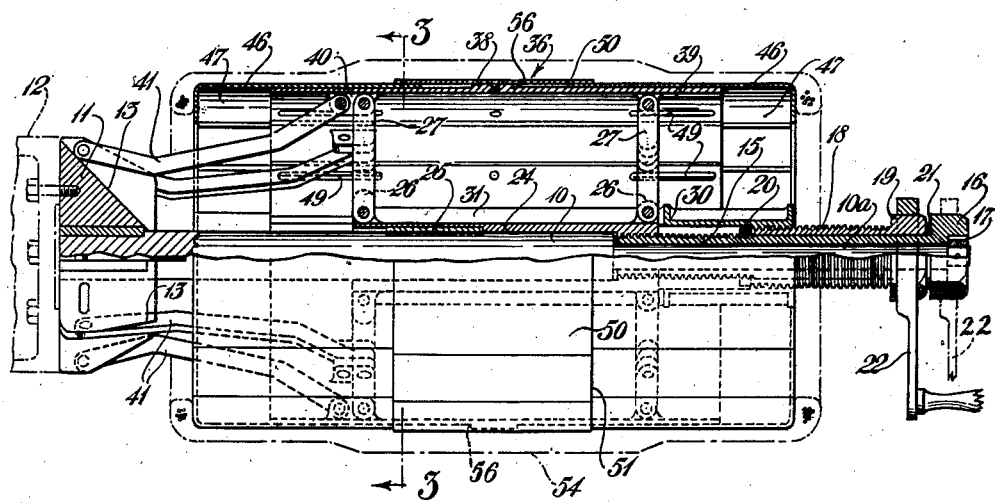
Figure 1 is a side view of a tire building form embodying the invention, in expanded or operative condition, a part thereof being shown in elevation and a part in longitudinal section.
Figure 2:
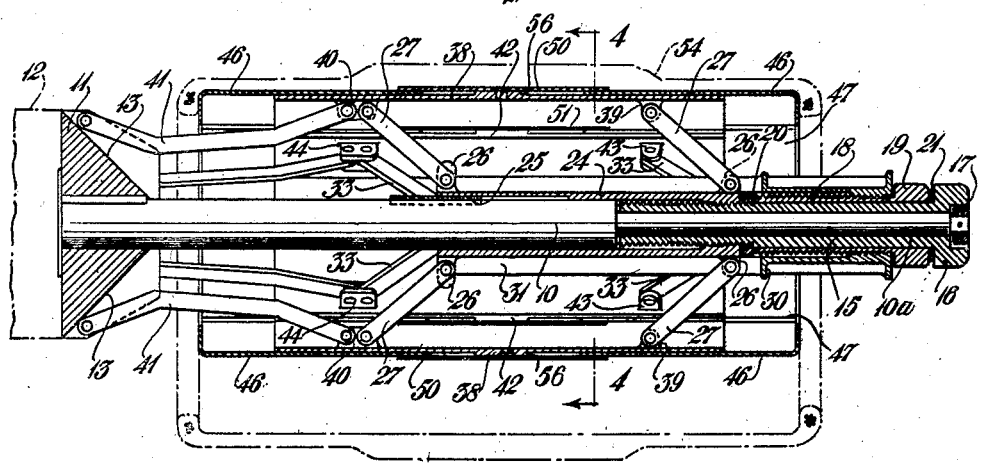
Figure 2 is a longitudinal sectional view of the improved form in collapsed condition.

Referring to the drawings, especially Figures 1 and 2 thereof, it will be seen that the form comprises an axial spindle 10 upon one end of which is keyed a frusto-conical flange 11, the latter being arranged for attachment to a flange 12 on the driving spindle (not shown) of a preferred or conventional tire building machine, whereby the spindle 10 may be rotated. The flange 11 is formed with a plurality of slots 13, 13 in its frusto-conical surface for a purpose presently to be explained, there being eight of the slots 13 in the illustrative embodiment of the invention herein shown. The free end portion of the spindle 10 is of reduced diameter as shown at 10a, said reduced portion constituting about 28% of the total length of the spindle.

Journaled upon the reduced portion 10a of the spindle 10 is an inner sleeve 15, the inner end portion of which is exteriorly threaded for about 40% of the total length of the sleeve, the outer end of the sleeve being formed with a hexagonal head 16. The sleeve 15 is retained on the spindle by a collar 17 on the end of the latter. Journaled upon the unthreaded portion of inner sleeve 15 is an outer sleeve 18 having a hexagonal head 19 on the outer end thereof, the remainder of the sleeve being exteriorly threaded. Axial movement of the sleeve 18 relatively of the sleeve 15 is restrained by a thrust collar 20 fixedly mounted upon the threaded portion of sleeve 15, and a thrust washer 21 disposed between the outer face of head 19 and the rear face of head 16. A removable hand-crank 22 is provided for engagement with either head 16 or 19 whereby the sleeves 15 and 18 selectively may be rotated relatively of the spindle 10.

Mounted for sliding movement upon the spindle 10 is an inner slide 24 that has a minor portion at its outer end interiorly threaded and engaged with the threads on the inner sleeve 15, the major portion of the said slide being positioned upon the spindle 10 rearwardly of the reduced portion 10a of the latter. A key 25 in the spindle 10 is received in a longitudinally extending keyway in the slide, the arrangement enabling the slide to move axially relatively of the spindle, but preventing angular or rotary movement of the slide relatively of the spindle. At each of its ends the slide 24 is formed integrally with a plurality of pairs of radially extending apertured ears 26, 26 and pivotally mounted in each pair of ears is one end of a link 27, the function of which presently will be explained. In the embodiment of the invention shown there are four pairs of ears 26 at each end of the inner slide, said ears being spaced 90 degrees apart circumferentially of the slide, and the ears at one end of the slide being in alignment with the ears at the other end of the slide, longitudinally of the latter.

Figure 4:
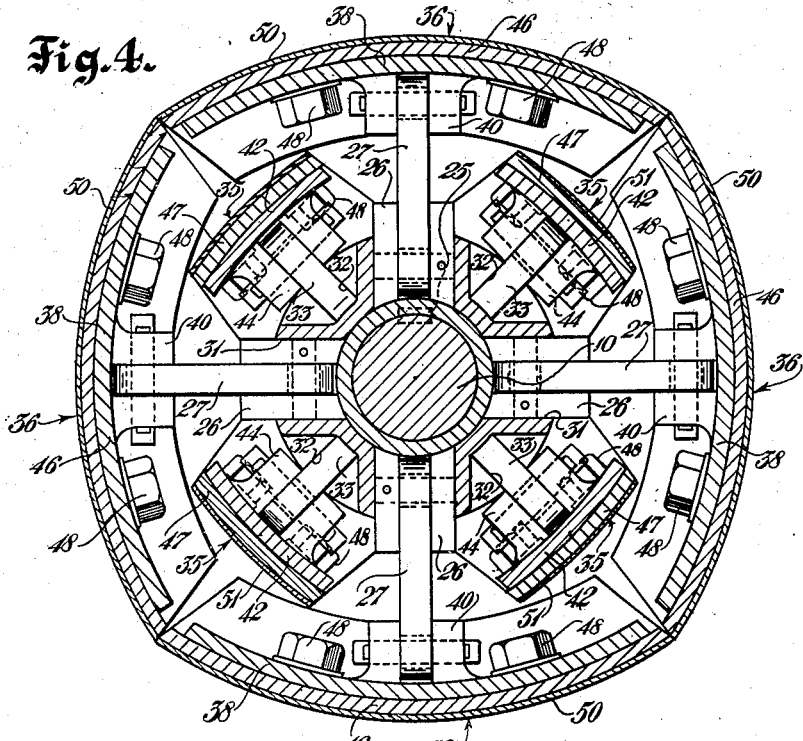
Figure 4 is a section, on a larger scale than Fig. 3, on the line 4—4 of Figure 2.
Figure 3:
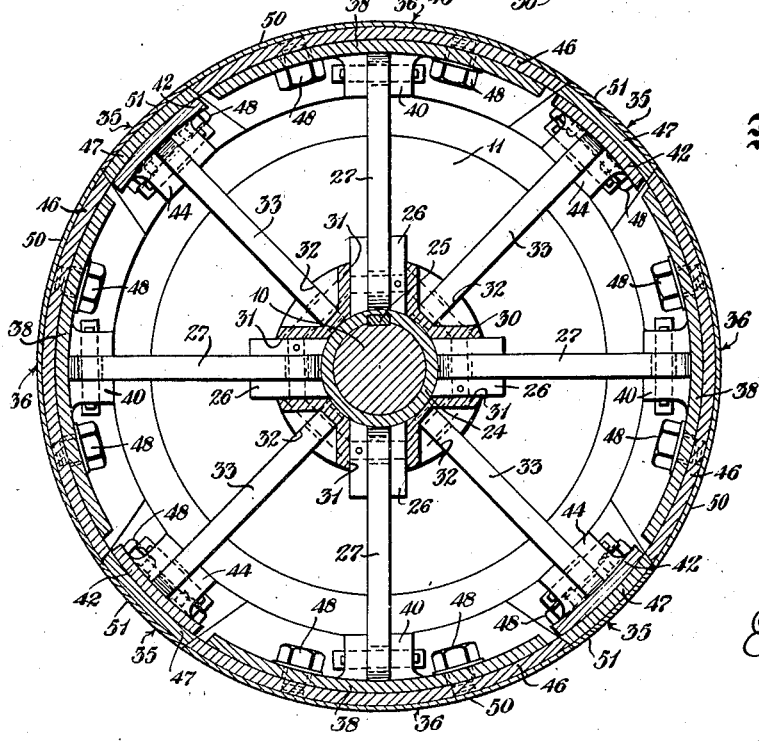
Figure 3 is a section on the line 3—3 of Figure 1.

Slidably mounted upon the inner slide 24 is an outer slide 30 that extends some distance beyond the outer end of the latter, the outer end portion of outer slide 30 telescoping with outer sleeve 18 and being interiorly threaded for engagement with the threaded portion of the said outer sleeve. The outer slide is longitudinally slotted at 31, 31 as is best shown in Figures 3 and 4, to enable the ears 26 of the inner slide 24 to project radially therethrough, the arrangement being such as to enable said slides to move relatively of each other and of the spindle 10 in an axial direction, but preventing angular or rotary movement of the slides relatively of each other. The outer slide 30 is slotted at 32, 32, Figures 3 and 4, to receive two series of radially extending links 33, 33 that are pivotally mounted in said slots. The arrangement is such that when the form is in the operative expanded condition shown in Figure 1, the links 33 of each series are disposed in the same transverse planes as the respective series of links 27. There are four links 33 in each series, the same being disposed between the links 27 that are connected to the inner slide 24.

The hereinbefore described mechanism constitutes the supporting and collapsing structure of the tire building form. The latter is a sectional cylindrical structure that is disposed concentrically of the spindle 10, and comprises four key sections each designated as a whole by the numeral 35, and four intermediate sections each designated as a whole by the numeral 36. The key sections 35 are relatively narrow in a circumferential direction as compared to the intermediate sections 36, and the abutting margins of the form-sections are obliquely disposed with relation to the radii of the drum, so as readily to enable the key sections to move relatively of the intermediate sections as they move radially of the form during the collapsing thereof and subsequent return to normal operative position.

Each intermediate section 36 comprises a base element 38 that is formed on its concave or inner circumferential face with two apertured and slotted ears or lugs, of which the lug nearest the outer end of the element is designated 39 and the lug nearest the inner end of the element is designated 40. A link 27 of the outer series of links is pivotally connected at its outer end to the lug 39 and a link 27 of the inner series of links is pivotally connected at its outer end to the lug 40. The latter is wider than the lug 39, and also provides a pivotal connection for one end of a somewhat angular arm or link 41, the other end of link 41 being received in a slot 13 in flange 11 and pivotally connected to the latter. In like manner each key section 35 comprises a base element 42 that is formed on its concave side with apertured and slotted lugs 43, 44 that are similar in all respects to the lugs 39, 40 respectively. Links 33 of the outer series of links are connected at their outer ends to the lugs 43 and links 33 of the inner series of links are connected at their outer ends to the lugs 44. Also connected to the respective lugs 44 are angular links 41 that also are pivotally connected to the flange 11, in the same manner and for the same purpose as are those links 41 that are connected to the intermediate sections. The lugs 39, 40 are spaced the same distance apart axially of the form as are the two series of lugs 26 on the inner slide 24, so that links 27 of the two series are parallel to each other at all times. Similarly lugs 43, 44 are spaced apart axially of the form the same distance as the two series of pivotal connections of the links 33 on the outer slide 30, with the result that links 33 of the two series are parallel to each other at all times.

The base elements 38 and 42 of the intermediate form sections 36 and key sections 35, respectively, are considerably shorter than the total work-supporting surface of the form, and each base element carries a pair of plates on its peripheral surface, at the respective ends thereof, which plates are adjustably positionable in an axial direction to vary the effective length of the form. The plates on the intermediate sections are designated 46, 46 and the plates on the key sections are designated 47, 47, all of said plates being angular and having their outer, overhanging end portions turned radially inwardly as shown to provide narrow end faces on the form, upon which end faces the bead portions of a tire casing are built during the use of the form. The plates 46, 47 are adjustably secured to the respective base elements of the form by cap screws 48 that extend through longitudinally extending slots 49 in the base elements and are threaded into said plates. To provide the form with a relatively smooth outer surface, each form section has a thin face-plate centrally mounted thereon, which face plate overlies the inner margins of the two adjustable plates, 46 or 47, of the section, the latter being formed with a relatively narrow and low, upstanding, centrally positioned rib 56 to which the face plate is secured. The face plates of the intermediate sections are designated 50 and the face plates of the key sections are designated 51.

The operation of the improved form is as follows. With the various elements thereof in the operative positions shown in Figures 1 and 3, the spindle 10 is caused to be rotated in the usual manner to rotate the form, and a pneumatic tire casing of any standard or preferred construction is built thereon, such a tire being indicated in broken lines at 54, Figures 1 and 2. The form is then collapsed to enable the removal of the tire 54. The first step necessary to effect collapse of the form is to move the outer slide 30 axially, toward the right as viewed in Figures 1 and 2, which movement is the result of angular or rotary movement of the threaded outer sleeve 18 relatively of the spindle 10. Such rotary movement of the sleeve 18 may be effected when the form is stationary by engaging the crank 22 with the nut 19 of said sleeve and then turning said crank. Alternatively, the crank engaged with said nut may be held stationary while the spindle 10 and form thereon is rotated. In either case the outer slide 30 is moved toward the end of the spindle and the links 33 connected to said slide exert a pull on the respective key sections 35 of the form. Since the sections 35 cannot move axially because of their connection with the fixed flange 11 through the agency of the links 41, they are forced to move radially inwardly, the links 33 acting on the sections with a toggle-like action. The said links and the elements connected thereto operate in the manner of a parallel motion device so that the form sections 35 remain in parallelism with the spindle 10 at all times. When the slide 30 reaches the limit of its outward axial movement, as shown in Figure 2, the key sections 35 are in the collapsed positions best shown in Figure 4.

In like manner the crank 22 is applied to the sleeve-head 16, as indicated in broken lines in Fig. 1, to effect relative angular or rotary movement between the spindle and the inner sleeve 15, with the result that the inner slide 24 is moved axially toward the outer end of the spindle. This causes the links 27 to exert a pull on the intermediate sections 36, in the manner of a toggle, the end-links 41 connected to said sections acting in the manner previously described to cause said sections to move radially inwardly. The sections 36 reach the limit of their inward movement when their lateral margins are in abutting relation, as shown in Figures 2 and 4, in which positions they overlie the key sections 35. In this condition of the form the perimeter thereof is smaller than the inside circumference of the tire 54 at the bead portions of the latter, thus enabling the fabricated tire readily to be removed from the form. Thereafter the form is restored to its operative expanded condition, this being effected by reversing the collapsing operations described. This completes an operative cycle of the form, which is repeated as often as a tire is built thereon.

Because the form sections do not require non-collapsible radial guides or the like, it is possible to collapse the form to smaller size than otherwise would be possible, and thereby adapts the form to the manufacture of tires of extremely small bead diameter as compared to their outside diameter. The links 27, 33 of the form are radially disposed in the operative position of the form, and thereby provide adequate radial support for the form sections against pressure exerted thereon during the manufacture of tires. The slides 24 and 30 constitute hub structures that support the form sections, which hub structures are movable axially relatively of the driving spindle and of each other, yet are operatively connected to the driving spindle so as to transmit driving torque therefrom to the form sections.

Modification may be resorted to without departing from the spirit of the invention or the scope thereof, as defined by the appended claims.

What is claimed is:

1. A collapsible sectional form for tire casings comprising two groups of form sections extending longitudinally of the form, respective toggle mechanisms connected to the two groups of form sections adapted to cause the sections of each group to move from and toward the axis of the form in unison, each of said toggle mechanisms comprising a hub structure, which hub structures are telescopically arranged with relation to each other, a spindle supporting and rotating said hub structures, and means for moving the hub structures independently of each other in an axial direction.

2. A collapsible form of the character described comprising a group of key sections and a group of intermediate sections extending longitudinally of the form, respective toggle mechanisms connected to the two groups of form sections adapted to move said groups of sections as units from and toward the axis of the form, each of said toggle mechanisms comprising a hub, a spindle supporting and driving said hubs, and means rotatable relatively of the said spindle for moving said hubs axially relatively of the spindle and relatively of each other, said hubs being arranged in telescoping relation to each other.

3. A collapsible form of the character described comprising a group of key sections and a group of intermediate sections extending longitudinally of the form, respective toggle mechanisms connected to the two groups of form sections adapted to move the sections of each group as a unit from and toward the axis of the form, each of said toggle mechanisms comprising a hub, a spindle supporting and driving said hubs, respective sleeves carried by said spindle and having threaded engagement with respective hubs for moving the latter axially when said sleeves are rotated relatively of the spindle and of each other, and nonradial means pivotally connected to one end of each section and to a fixed point beyond the end of the section for preventing appreciable longitudinal movement of the sections as they move from and toward the axis of the form.

4. A combination as defined in claim 3 in which the sleeves are arranged in telescoping relation to each other.

5. A collapsible form of the character described comprising a group of key sections and a group of intermediate sections extending longitudinally of the form, a rotatable spindle disposed axially of the form, a flange fixedly mounted on one end of said spindle beyond one end of the form, links pivotally connected at one end to said flange and at their other ends to respective form sections, said links extending substantially in an axial direction, a pair of hubs mounted upon said spindle, links extending radially from each hub and connected to form sections of one group thereof to constitute toggle mechanism, and means for moving said hubs axially relatively of the spindle and relatively of each other.

6. A combination as defined in claim 5 in which the hubs are disposed in telescopic relation to each other, the outer hub being formed with slots through which extend the links connected to the inner hub.

7. A collapsible form of the character described comprising a group of key sections and a group of intermediate sections extending longitudinally of the form, a rotatable axial spindle for the form, a flange on the spindle disposed beyond one end of the form, links pivotally mounted at one end in respective slots in said flange and pivotally connected at their other ends to respective form sections, said links extending substantially in an axial direction, a pair of parallel links pivotally connected at one end to each key section, a hub mounted on said spindle to which the other ends of the last mentioned links are connected, a pair of parallel links connected at one end to each intermediate section, a hub that is in telescopic relation to said first mentioned hub and to which the other ends of the last mentioned links are connected, and a pair of telescoped sleeves journaled upon the spindle and having threaded engagement with the respective hubs for effecting axial movement of the latter when said sleeves are rotated relatively of each other and of the spindle.

8. A collapsible sectional drum for tire casings, said drum comprising two groups of elongate, longitudinally extending drum sections, respective groups of toggle mechanisms connected to the two groups of drum sections, each individual toggle mechanism comprising a pair of parallel links that are connected to a drum section at spaced points longitudinally thereof and adapted to move the section from and toward the axis of the drum while maintaining its parallel relation thereto, means for operating the groups of toggle mechanisms independently of each other, and means pivotally connected to the drum sections and to fixed points exteriorly of the drum for preventing appreciable longitudinal movement of the sections as they move from and toward the axis of the drum.

9. A collapsible sectional drum for tire casings, said drum comprising two groups of elongate, longitudinally extending drum sections, respective groups of toggle mechanisms connected to the two groups of drum sections, each individual toggle mechanism comprising a pair of parallel links that are connected to a drum section at spaced points longitudinally thereof, interiorly of the drum, and adapted to move the section from and toward the axis of the drum while maintaining it in parallel relation to said axis, respective hubs for the groups of toggle mechanisms, a spindle upon which said hubs are supported, means for moving the hubs relatively of the spindle and relatively of each other, and means pivotally connected to each drum section and to respective fixed points beyond an end of the drum preventing appreciable longitudinal movement of the sections as they move from and toward the axis of the drum.

EARL L. BISHOP.